US011115639B2

(12) United States Patent
Park et al.

(10) Patent No.: US 11,115,639 B2
(45) Date of Patent: Sep. 7, 2021

(54) SYSTEM AND METHOD OF GENERATING PANORAMIC VIRTUAL REALITY IMAGE USING A PLURALITY OF PHOTOGRAPH IMAGES

(71) Applicant: KOREA ELECTRONICS TECHNOLOGY INSTITUTE, Seongnam-si (KR)

(72) Inventors: Woochool Park, Incheon (KR); Junhwan Jang, Gwangju-si (KR); Younghwa Kim, Seoul (KR); Jinwook Yang, Goyang-si (KR); Sangpil Yoon, Seoul (KR); Hyunwook Kim, Goyang-si (KR); Eunkyung Cho, Seoul (KR); Minsu Choi, Seoul (KR); Junsuk Lee, Seoul (KR); Jaeyoung Yang, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 32 days.

(21) Appl. No.: 16/198,562

(22) Filed: Nov. 21, 2018

(65) Prior Publication Data

US 2019/0158804 A1 May 23, 2019

(30) Foreign Application Priority Data

Nov. 23, 2017 (KR) ........................ 10-2017-0157592

(51) Int. Cl.
*H04N 13/133* (2018.01)
*H04N 5/247* (2006.01)
(Continued)

(52) U.S. Cl.
CPC ......... *H04N 13/133* (2018.05); *G06T 3/4038* (2013.01); *H04N 5/23238* (2013.01); *H04N 5/247* (2013.01); *H04N 13/246* (2018.05)

(58) Field of Classification Search
CPC .............. H04N 13/133; H04N 13/246; H04N 5/23238; H04N 5/247; G06T 3/4038
(Continued)

(56) References Cited

U.S. PATENT DOCUMENTS

2006/0244826 A1* 11/2006 Chew ............... G08B 13/19608
348/143
2013/0308858 A1* 11/2013 Xu ........................... H04N 1/60
382/165
(Continued)

FOREIGN PATENT DOCUMENTS

KR    10-2014-0085844 A    7/2014
KR    10-2016-0013263 A    2/2016
KR    10-2017-0086203 A    7/2017

OTHER PUBLICATIONS

Office Action of corresponding Korean Patent Application No. 10-2017-0157592—5 pages (dated May 7, 2019).

*Primary Examiner* — Jae N Noh
(74) *Attorney, Agent, or Firm* — Knobbe Martens Olson & Bear LLP

(57) ABSTRACT

The described technology provides a system and method of generating a 360-degree panoramic virtual reality (VR) image by using a plurality of photograph images. A plurality of image capturing devices capture and transmit the plurality of photograph images, respectively. An image conversion device receives the plurality of photograph images from the plurality of image capturing devices, calibrates each of the plurality of photograph images using characteristic information of respective one of the plurality of image capturing devices, and stitches calibrated photograph images to generate the 360-degree panoramic VR image. According to embodiments, the user can check a situation of a monitoring
(Continued)

area while changing the viewpoint of the 360-degree panoramic VR image or enjoy the generated VR contents at a high degree of immersion.

6 Claims, 1 Drawing Sheet

(51) Int. Cl.
  *G06T 3/40* (2006.01)
  *H04N 5/232* (2006.01)
  *H04N 13/246* (2018.01)
(58) Field of Classification Search
  USPC .......................................................... 348/36
  See application file for complete search history.

(56) References Cited

U.S. PATENT DOCUMENTS

2018/0005410 A1* 1/2018 Wang .................... G06T 11/001
2018/0063513 A1* 3/2018 Bar ......................... G06T 7/269

* cited by examiner

SYSTEM AND METHOD OF GENERATING PANORAMIC VIRTUAL REALITY IMAGE USING A PLURALITY OF PHOTOGRAPH IMAGES

CROSS-REFERENCE TO RELATED APPLICATION

The present application claims priority to Korean Patent Application No. 10-2017-0157592, filed on Nov. 23, 2017, in the Korean Intellectual Property Office, which is incorporated herein in its entirety by reference.

TECHNICAL FIELD

The present disclosure relates to an image processing system and method and, more particularly, to a system and method of generating a 360-degree panoramic virtual reality (VR) image using a plurality of photograph images acquired by a plurality of image capturing devices.

BACKGROUND

Virtual Reality (VR) is emerging as one of major issues in the information and communications technologies (ICT) industry, and information technology (IT) companies are exploring ways to generate profits by selling VR devices.

In order to produce contents for providing VR experiences, being developed are 360-degree VR technologies in which images captured at a plurality of viewpoints are stitched to generate a multiple-viewpoint panoramic image and the panoramic VR image can be viewed in different viewpoints according to an intention of a user watching the panoramic VR image.

For example, Korean unexamined patent publication No. 2017-0086203 entitled METHOD FOR PROVIDING SPORTS BROADCASTING SERVICE BASED ON VIRTUAL REALITY discloses a system in which photograph images in a sports arena are collected along with respective camera identifiers including position information of corresponding cameras, and the photograph images are stitched by use of the position information of the cameras according to eye tracking data acquired by a head mount display worn by a user.

However, in case that imaging characteristics of the cameras for capturing the photograph images at respective viewpoints are different from one another, it is difficult to convert the photograph images captured by the cameras into a panoramic image.

SUMMARY

In order to solve the above problems, the present disclosure provides a system and method of generating a 360-degree panoramic virtual reality (VR) image by using a plurality of photograph images acquired by a plurality of image capturing devices each of which may have imaging characteristics different from those of the other cameras.

According to an aspect of an exemplary embodiment, a system for generating a 360-degree panoramic VR image using a plurality of photograph images, includes: a plurality of image capturing devices configured to capture and transmit the plurality of photograph images, respectively; and an image conversion device configured to receive the plurality of photograph images from the plurality of image capturing devices, calibrate each of the plurality of photograph images using characteristic information of respective one of the plurality of image capturing devices, and stitch calibrated photograph images to generate the 360-degree panoramic VR image.

In embodiments, the plurality of photograph images are formatted in RGB arrays.

In embodiments, the characteristic information includes a view angle, zooming ratio, brightness, and resolution of an image capturing device corresponding to the characteristic information.

In embodiments, the image conversion device requests and receives the characteristic information from an image capturing device corresponding to the characteristic information.

According to an aspect of another exemplary embodiment, a method of generating a 360-degree panoramic VR image using a plurality of photograph images, includes: capturing and transmitting the plurality of photograph images by a plurality of image capturing devices; receiving the plurality of photograph images, by an image conversion device, from the plurality of image capturing devices and calibrating each of the plurality of photograph images using characteristic information of respective one of the plurality of image capturing devices; and generating the 360-degree panoramic VR image by stitching calibrated photograph images.

In embodiments, the plurality of photograph images are formatted in RGB arrays.

In embodiments, the characteristic information includes a view angle, zooming ratio, brightness, and resolution of an image capturing device corresponding to the characteristic information.

In embodiments, the method may further includes an operation of: requesting and receiving the characteristic information, by the image conversion device, from an image capturing device corresponding to the characteristic information.

An aspect of the present disclosure enables to generate the 360-degree panoramic VR image in real time by using a plurality of photograph images acquired by a plurality of image capturing devices each of which has imaging characteristics different from those of the other cameras. Accordingly, the user can check a situation of a monitoring area while changing the viewpoint of the 360-degree panoramic VR image or enjoy the generated VR contents at a high degree of immersion.

Further advantages and areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings.

Figure 1:
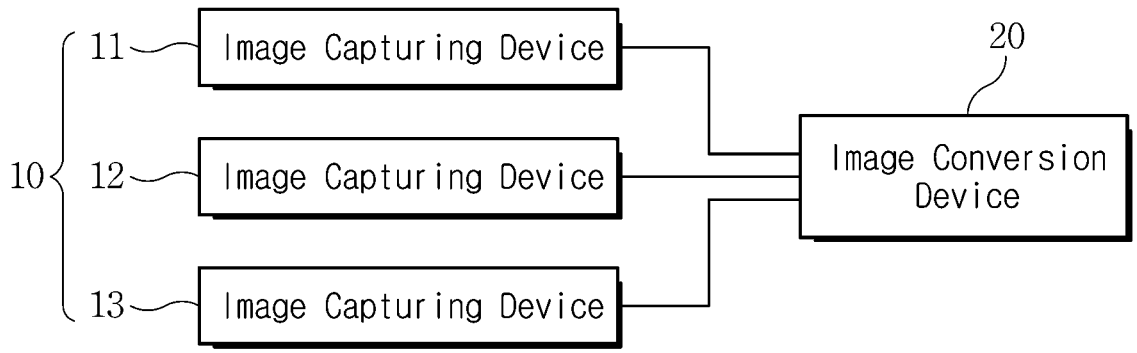
FIG. 1 is a block diagram of an image conversion system according to an embodiment of the present disclosure.

The drawings described herein are for illustration purposes only and are not intended to limit the scope of the present disclosure in any way.

DETAILED DESCRIPTION

In the following description and the accompanied drawings, detailed descriptions of well-known functions or configuration that may obscure the subject matter of the present disclosure will be omitted for simplicity.

The terms and words used in the following description and appended claims are not necessarily to be construed in an ordinary sense or a dictionary meaning, and may be appropriately defined herein to be used as terms for describing the present disclosure in the best way possible. Such terms and words should be construed as meaning and concept consistent with the technical idea of the present disclosure. The embodiments described in this specification and the configurations shown in the drawings are merely preferred embodiments of the present disclosure and are not intended to limit the technical idea of the present disclosure. Therefore, it should be understood that there may exist various equivalents and modifications which may substitute the exemplary embodiments at the time of filing of the present application.

The present disclosure relates to a technology for converting a plurality of photograph images into a 360-degree virtual reality (VR) image. Hereinbelow, exemplary embodiments of the present disclosure will be described in detail with reference to the accompanying drawings.

An aspect of the present disclosure provides a system for generating a spherical 360-degree panoramic VR image from a series of photos. The system comprises a plurality of cameras 10 for capturing a plurality of photos (e.g., in RGB arrays). For each camera 11-13, the system stores characteristic information including (1) view angle, (2) zooming ratio, (3) brightness, and (4) resolution in its local memory in advance prior to take the series of photographs. The system stores further includes an image conversion device 20 for calibrating the photos. After the series of photos are taken, the image conversion device calibrates the photos using the pre-stored characteristic in the local memory without communicating with the cameras 10. After calibrating the captured photos, the image conversion device performs stitching of the calibrated photos to generate a single 360 degree panoramic image.

FIG. 1 is a block diagram of an image conversion system according to an embodiment of the present disclosure.

Referring to FIG. 1, the image conversion system 100 of the present embodiment includes an image capturing sub-system 10 and an image conversion device 20. The image capturing sub-system 10 includes a plurality of image capturing devices 11, 12, and 13. Each of the image capturing devices 11-13 and the image conversion device 20 includes a data input/output interface, an operation unit, a memory, and a program storage.

The image capturing sub-system 10 takes photograph images by use of cameras. In particular, each of the plurality of the image capturing devices 10 in the image capturing sub-system 10 takes a photograph image independently from each other.

Each of the image capturing devices 11-13 takes the photograph image using a camera provided therein, and transmits a photograph image to the image conversion device 20.

At this time, in embodiments, the captured images transmitted from the image capturing devices 11-13 to the image conversion device 20 are formatted in RGB arrays.

In embodiments, one of the image capturing devices 11-13 has at least one imaging characteristic (such as view angle, zooming ratio, brightness, and resolution) that is different from that of another of the image capturing devices 11-13. Accordingly, the RGB arrays corresponding to respective image capturing devices 11-13 have different attributes different from another RGB arrays output by another image capturing devices.

The image conversion device 20 receives the photograph images from the image capturing sub-system 10 and converts the photograph images into a 360-degree virtual reality (VR) panoramic image.

Upon receiving the photograph images from the image capturing sub-system 10, the image conversion device 20 calibrates the photograph images by using the characteristics information of the image capturing devices 11, 12 and 13 having taken the photograph images.

That is, since the image capturing devices 11-13 have the imaging characteristics different from those of another image capturing devices and thus output the RGB arrays of which attributes are different from another RGB arrays output by another image capturing devices, the image conversion device 20 calibrates each of the photograph images with reference to the imaging characteristic information of the individual image capturing devices 11, 12 and 13 into a state suitable for being stitched to each other.

In embodiments, the image conversion device 20 performs the calibration of the photograph image with reference to the imaging characteristic information such as the view angle, zooming ratio, brightness, and resolution of the each of the image capturing devices 11-13.

The image conversion device 20, in embodiments, stores the imaging characteristic information of the individual image capturing devices 11-13 in advance, and perform the calibration of the photograph images using the pre-stored imaging characteristic information upon receiving the photograph images.

Also, the image conversion device 20, in embodiments, requests the imaging characteristic information from the image capturing device 11, 12, or 13 after receiving the photograph image from the image capturing device 11, 12, or 13 to perform the calibration of the photograph images using the imaging characteristic information received from the image capturing device 11, 12, or 13.

After calibrating the photograph images received from the capturing sub-system 10 in this manner, in embodiments, the image conversion device 20 generates a 360-degree panoramic VR image by stitching the photograph images.

Thus, the image conversion device 20 can convert the photograph images acquired by the plurality of image capturing devices 11-13 into a single panoramic image with a small operation burden by stitching the photograph images in real time.

A process of converting the photograph images into the 360-degree panoramic VR image according to the present disclosure will now be described in detail with reference to FIG. 2.

Figure 2:
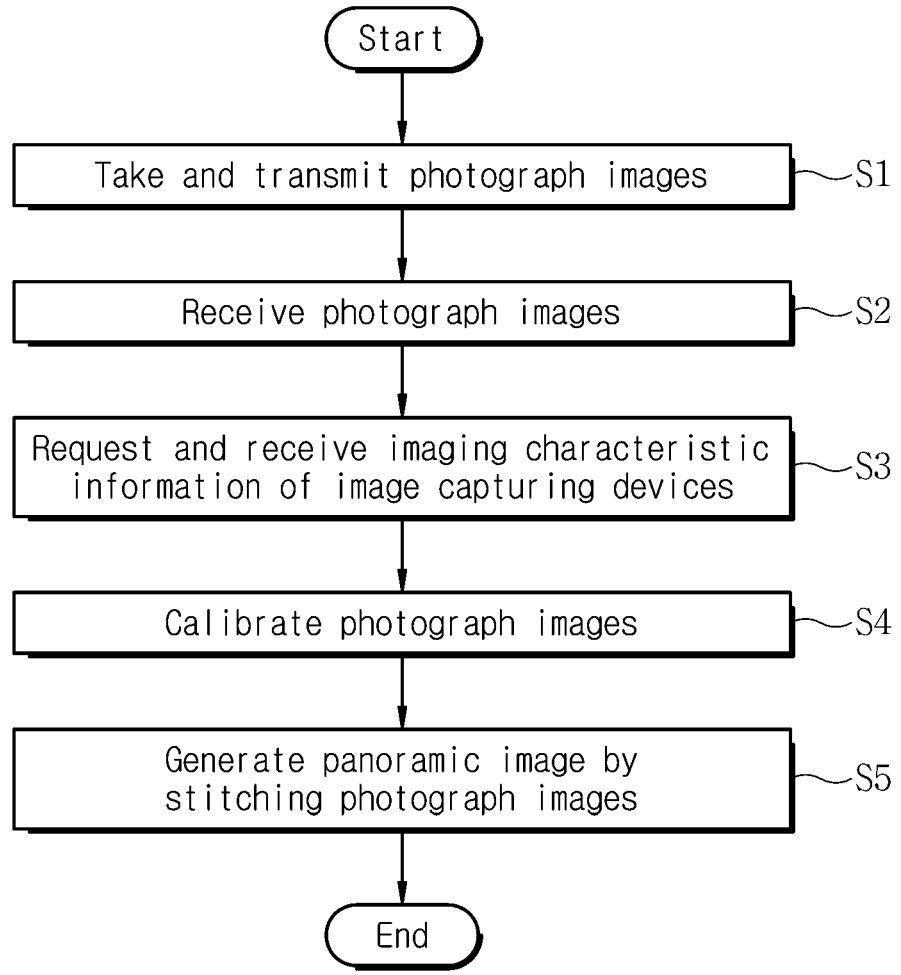
FIG. 2 is a flowchart illustrating an image conversion process according to an embodiment of the present disclosure.

FIG. 2 is a flowchart illustrating an image conversion process according to an embodiment of the present disclosure.

Referring to an embodiment of FIG. 2, the plurality of image capturing devices 11-13 take photograph images using their own cameras, and transmits the photograph images to the image conversion device 20 (operation S1).

In embodiments of the operation S1, each of the plurality of image capturing devices 11-13 has imaging characteristics such as the view angle, zooming ratio, brightness, resolution, and the like different from those of another image capturing devices.

In embodiments, the photograph images acquired by the plurality of image capturing devices 11-13 and transmitted to the image conversion device 20 in the operation S1 are formatted in the RGB array. In certain embodiments, the photograph images are formatted in a format other than the RGB array.

Afterwards, the image conversion device 20 receives the plurality of photograph images captured by the plurality of image capturing devices in operation S2 and requests and receives, from the image capturing device corresponding to each of the photograph images, the imaging characteristic information of the image capturing device in operation S3.

Also, the image conversion device 20 calibrates each of the photograph images using the imaging characteristic information of the image capturing devices received in the operation S3 (operation S4).

In the operation S4, the image conversion device 20 performs the image calibration using the imaging characteristic information such as the view angle, zooming ratio, brightness, and resolution.

Subsequently, the image conversion device 20 stitches the photograph images calibrated in the operation S4 to generate a spherical 360-degree panoramic VR image that can be viewed from all directions (operation S5).

According to certain embodiments, the image conversion device 20 may store the imaging characteristic information of the plurality of image capturing devices 11-13 in advance in a storage to use the pre-stored imaging characteristic information for the image calibration of the operation S4 instead of requesting and receiving the imaging characteristic information from each image capturing device when the information is needed as in the operation S3.

The method of generating the 360-degree VR image using the plurality of photograph images according to an embodiment of the present disclosure can be implemented based on a form of a computer program that may be recorded on a computer readable storage medium and readable by various computing devices.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

The description of the disclosure is merely exemplary in nature and, thus, variations that do not depart from the substance of the disclosure are intended to be within the scope of the disclosure. Such variations are not to be regarded as a departure from the spirit and scope of the disclosure. Also, it is to be understood that specific terms used herein are for the purpose of describing the present disclosure only and are not intended to limit the scope of the present disclosure.

What is claimed is:

1. A system for generating a 360-degree panoramic virtual reality (VR) image using a plurality of photograph images, comprising:
    a plurality of image capturing devices configured to capture and transmit the plurality of photograph images, respectively; and
    an image conversion device in communication with plurality of image capturing devices,
    wherein the plurality of image capturing devices comprise a first camera and a second camera, wherein the first camera is configured to take a first image using first image characteristic information, wherein the second camera is configured to take a second image using second image characteristic information that is different from the first image characteristic information such that the first and second images have different image attributes, wherein each of the first image characteristic information and the second image characteristic information comprises a viewing angle, a zooming ratio, and a resolution, and wherein the image conversion device is configured to:
    receive the first image from the first camera and receive the second image from the second camera;
    prior to receiving the first image and the second image store the first image characteristic information and the second image characteristic information in a local memory of the image conversion device;
    retrieve the first image characteristic information and the second image characteristic information from the local memory of the image conversion device;
    calibrate the first image using both the retrieved first image characteristic information and the retrieved second image characteristic information to obtain a first calibrated image without communicating with the first camera;
    calibrate the second image using both the retrieved first image characteristic information and the retrieved second image characteristic information to obtain a second calibrated image without communicating with the second camera; and
    stitch the first calibrated image and the second calibrated image to generate a single 360-degree panoramic VR image configured to be viewed from all directions.

2. The system as claimed in claim 1, wherein the plurality of photograph images are formatted in RGB arrays.

3. A method of generating a 360-degree panoramic virtual reality (VR) image using a plurality of photograph images, comprising:
    capturing the plurality of photograph images by a plurality of image capturing devices, wherein the plurality of image capturing devices comprise a first camera and a second camera, wherein the first camera is configured to take a first image using first image characteristic information, wherein the second camera is configured to take a second image using second image characteristic information that is different from the first image characteristic information such that the first and second images have different image attributes, and wherein each of the first image characteristic information and the second image characteristic information comprises a viewing angle, a zooming ratio, and a resolution;
    receiving, by an image conversion device, the first image from the first camera and receive the second image from the second camera;
    prior to receiving the first image and the second image, storing the first image characteristic information and the second image characteristic information in a local memory of the image conversion device;
    retrieving the first image characteristic information and the second image characteristic information from the local memory of the image conversion device;
    calibrating the first image using both the retrieved first image characteristic information and the retrieved second image characteristic information to obtain a first calibrated image without communicating with the first camera;
calibrating the second image using both the retrieved first image characteristic information and the retrieved second image characteristic information to obtain a second calibrated image without communicating with the second camera; and
generating the 360-degree panoramic VR image by stitching the first calibrated image and the second calibrated image.

4. The method as claimed in claim 3, wherein the plurality of photograph images are formatted in RGB arrays.

5. The system as claimed in claim 1, wherein each of the first image characteristic information and the second image characteristic information further comprises a brightness.

6. The method as claimed in claim 3, wherein each of the first image characteristic information and the second image characteristic information further comprises a brightness.

* * * * *